(12) United States Patent
Kloss

(10) Patent No.: US 7,019,252 B2
(45) Date of Patent: Mar. 28, 2006

(54) WORKPIECE FEEDER DEVICE FOR AN ELECTRON BEAM PROCESSING DEVICE

(75) Inventor: Ingo Kloss, Maintal (DE)

(73) Assignee: PTR Prazisionstechnik GmbH, Maintal (DE)

( * ) Notice: Subject to any disclaimer, the term of this patent is extended or adjusted under 35 U.S.C. 154(b) by 116 days.

(21) Appl. No.: 10/490,518

(22) PCT Filed: Sep. 20, 2002

(86) PCT No.: PCT/EP02/10584

§ 371 (c)(1),
(2), (4) Date: Mar. 23, 2004

(87) PCT Pub. No.: WO03/028938

PCT Pub. Date: Apr. 10, 2003

(65) Prior Publication Data

US 2004/0256364 A1 Dec. 23, 2004

(30) Foreign Application Priority Data

Sep. 24, 2001 (DE) .......................... 101 46 838

(51) Int. Cl.
*B23K 15/00* (2006.01)
*B23K 15/06* (2006.01)

(52) U.S. Cl. ................................. 219/121.13

(58) Field of Classification Search ............ 219/121.12, 219/121.13, 121.21, 121.22, 121.23, 121.35, 219/121.63, 121.64, 121.86
See application file for complete search history.

(56) References Cited

U.S. PATENT DOCUMENTS

| 3,874,525 | A | * | 4/1975 | Hassan et al. ........... 414/744.4 |
| 4,355,937 | A | | 10/1982 | Mack et al. |
| 4,886,592 | A | * | 12/1989 | Anderle et al. ........ 204/298.25 |
| 5,112,469 | A | | 5/1992 | Kempf et al. |
| 5,135,635 | A | | 8/1992 | Ikeda et al. |
| 6,203,677 | B1 | | 3/2001 | Konig et al. |

FOREIGN PATENT DOCUMENTS

| DE | 198 12 670 | 10/1999 |
| EP | 0 443 149 | 8/1991 |
| EP | 0 389 820 | 10/1991 |
| EP | 0 449 227 | 10/1991 |
| FR | 1 404 827 | 7/1965 |

* cited by examiner

*Primary Examiner*—Samuel M. Heinrich
(74) *Attorney, Agent, or Firm*—Foley Hoag LLP

(57) ABSTRACT

A workpiece supply device for an electron beam processing device is provided that can reduce the cycle times for changing a workpiece using a multi-functional workpiece holding device.

9 Claims, 2 Drawing Sheets

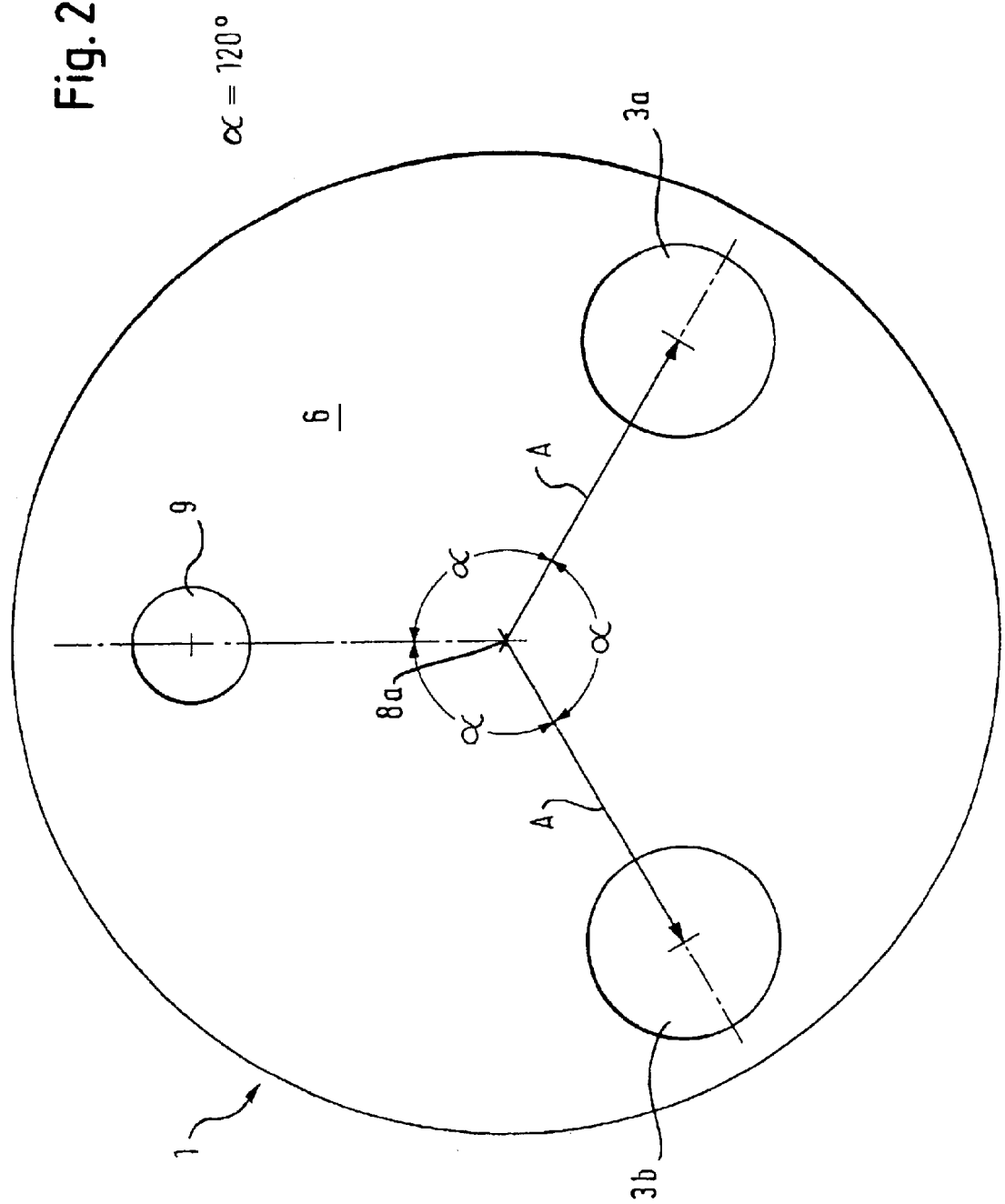

WORKPIECE FEEDER DEVICE FOR AN ELECTRON BEAM PROCESSING DEVICE

CROSS-REFERENCE

This application is the US national stage filing of International Application No. PCT/EP02/10584, which was filed Sep. 20, 2002 and claimed priority to German Patent Application No. 101 46 838.5 filed Sep. 24, 2001.

TECHNICAL FIELD

The present invention relates to a work piece supplying device for an electron beam processing device.

THE RELATED ART

Electron beam processing, and in particular electron beam welding, also for medium and small workpieces, is spreading.

Electron beam welding (=EB welding; EB=electron beam) has significant advantages, in particular with respect to the precision of introducing the energy when welding, in comparison to other welding technologies, which result in a nearly warp-free and dimensionally accurate welding process. Therefore, in particular, workpieces, for which the welding must be performed as warp-free and dimensionally accurate as possible, such as gear wheels for gear boxes or parts for manual or automatic transmissions, are preferably welded using electron beam welding.

With respect to electron beam welding, there are differences between welding at normal pressure or slightly reduced normal pressure, i.e., "non-vac-welding," and welding under vacuum (i.e., at a reduced pressure of $\leq 10^{-1\,2}$ mbar=half vacuum or $\leq 10^{-4}$ mbar=high vacuum). Electron beam welding under vacuum has the advantage of being a "clean" process, i.e., an essentially contamination-free environment and utilizing essentially constant process parameters, such as pressure, temperature, moisture, etc.

The manufacturing of workpieces in small series or in large series with vacuum electron beam welding requires the supply (charging and discharging) of workpieces into the vacuum environment and processing in the vacuum environment. In known vacuum welding apparatus, the vacuum chamber was brought to normal pressure for every workpiece or for a batch of multiple workpieces, the charging and discharging of the unprocessed and processed workpieces was then performed, and the vacuum chamber was again evacuated.

A device for electron beam welding is known from DE 197 29 083 C1, in which multiple workpieces are held on a change pallet and are welded substantially simultaneously with an electron beam. A plurality of these change pallets is arranged on a change plate, which change plate is formed as the sealing flange of a processing chamber for electron beam processing. This processing chamber (vacuum chamber) is flooded at each workpiece change.

Another electron beam processing device is known from CH 426 025, in which an electron beam gun is arranged in a vacuum chamber. The embodiment shown in FIGS. 1 and 2 of CH 426 025 comprises a vacuum chamber having two openings; a lock device having an assigned workpiece holding device is provided at each of the openings. When the workpiece is changed, the lock device is sealed against the vacuum chamber, and the workpiece holding device is positioned outside of the lock. The workpiece is moved together with the workpiece holding device into the lock for processing, and the lock is sealed by a sealing device that is connected to the workpiece holding device. Then, the lock is opened relative to the vacuum chamber such that the workpiece, which is positioned in the lock that is now connected to the vacuum chamber, can be processed with the electron beam. The electron beam gun is moved to the respective lock for processing.

Further electron beam processing devices are known from each of U.S. Pat. No. 3,731,052 and JP 62-248583 A.

A device for the transport of substrates, in particular CD substrates, is known from EP 0 790 330 B1, in which a vacuum chamber is sealed with respect to a lock chamber by means of a plate of a substrate accommodating part. When the lock chamber is sealed against normal pressure, a substrate is placed on a turntable by lowering the substrate accommodating part and is transferred to the turntable; the substrate is then moved to its processing position by means of the turntable.

The known technology results in comparatively long cycle times and has the problem that the vacuum chamber is contaminated due to the requirement of regularly bringing the vacuum chamber to normal pressure.

SUMMARY OF THE INVENTION

It is an object of the present invention to provide an improved workpiece supplying device for the electron beam processing of workpieces, which device significantly reduces the above disadvantages.

In one aspect of the present teachings, a workpiece supply device for an electron beam processing device comprises a vacuum chamber having at least one connector for an electron beam gun and at least one charging/discharging opening and at least two workpiece holding devices. A moving device is provided for moving each of the workpiece holding devices to a corresponding charging/discharging position at the at least one charging/discharging opening and to a processing position at the at least one connector or the electron beam gun. One workpiece locking device is provided at each charging/discharging opening, which can be selectively evacuated or can be brought to normal pressure. The workpiece locking device comprises a closable lock opening. The workpiece holding devices and the moving device are arranged in the vacuum chamber. Further, the workpiece holding devices are adapted for pressure sealed closing of the charging/discharging opening and are selectively movable into a closing position by the moving device.

BRIEF DESCRIPTION OF THE DRAWINGS

Further features and advantages result from the description of embodiments referring to the Figures:

FIG. 2 shows a top view of a second embodiment of the workpiece supply device.

DETAILED DESCRIPTION OF THE INVENTION

Figure 1:
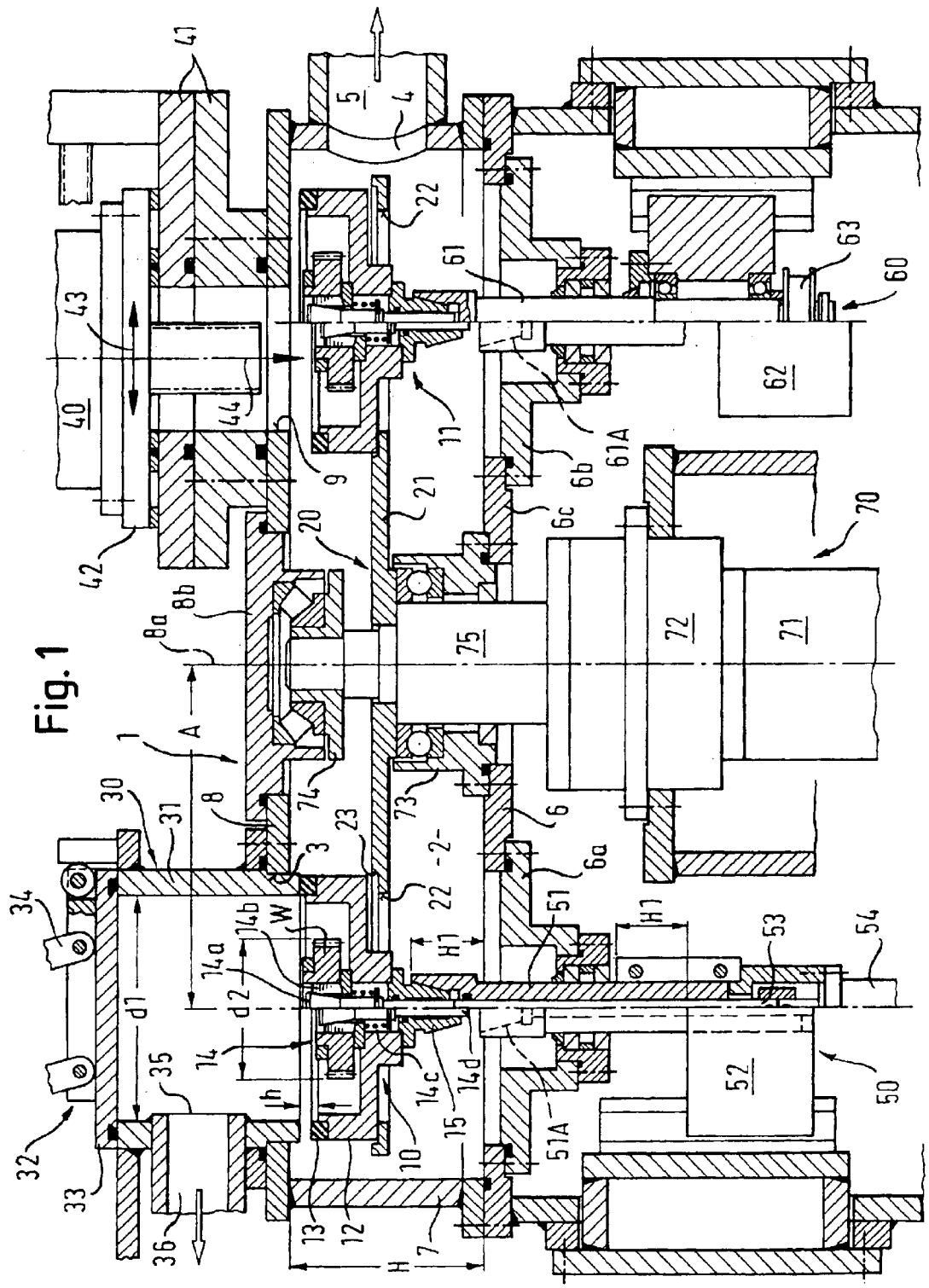
FIG. 1 shows a cross-sectional view of a first embodiment of the workpiece supply device.

A cross-sectional view of the workpiece supply device of a first embodiment is shown in FIG. 1. The first embodiment comprises a charging/discharging opening and a connector for an electron beam generator, as will be explained below. The second embodiment, a top view of which is shown in FIG. 2, comprises two charging/discharging openings and a connector for an electron beam generator. In general, the number of charging/discharging openings and connectors for electron beam generators is not limited to the shown examples.

The first embodiment will now be described. A vacuum chamber 1 is shown in FIG. 1. The inner space 2 of the vacuum chamber comprises a charging/discharging opening 3 and an evacuation opening 4. Two workpiece holding devices 10, 11 and a workpiece holder moving device 20 are arranged in the vacuum chamber 1. A workpiece locking device 30 is positioned on the charging/discharging opening 3. The evacuation opening 4 is connected to a pump station (not shown) via a pipe 5.

In the first embodiment, the vacuum chamber 1 is essentially formed with a circular cross-section (as in the second embodiment; see FIG. 2) and with a height H.

In the embodiment shown in FIG. 1, the vacuum chamber 1 is formed with a bottom plate 6 comprising three openings for connecting later-described lifting and turning devices, a sidewall 7 defining the circular inner space, and a cover plate 8 defining the inner space 2 towards the top. The cover plate 8 comprises the charging/discharging opening 3 that is also circular, an opening for accommodating a bearing of a rotating device, which will be described later, and the connection opening 9 for an electron beam generator 40. In a known manner, the electron beam generator 40 is pressure sealed by a flange 41 to the vacuum chamber 1 via the opening 9. The electron beam generator 40 is displaceable over the opening 9 (see arrow 43) by means of a displacement device 42 for adjusting the processing area of the electron beam in a known manner. The axis of the electron beam is indicated in FIG. 1 by the arrow 44.

The workpiece locking device 30 is set on or in the opening 3. The workpiece locking device 30 is preferably formed as a hollow cylinder 31, and a lock 32 is arranged at its upper side. The lock 32 comprises a cover 33 that is movable by means of an actuating member 34 to open and close the upper opening of the cylinder 31. The cylinder 31 comprises a side opening 35 connected to a pump station via a pipe 36. The bottom side of the cylinder is open to the inner space 2 of the vacuum chamber 1 via the charging/discharging opening 3. This can be implemented, as in case of the embodiment shown in FIG. 1, by inserting the cylinder into the charging/discharging opening 3, or alternatively, by setting the cylinder onto the cover plate 8, and in both cases by sealing the connection.

The charging/discharging opening 3 and the connection opening 9 are offset by 180° relative to the middle axis 8a of the cover plate 8 in the embodiment shown in FIG. 1.

An opening is also provided at a location of the bottom plate 6 that is perpendicularly below the charging/discharging opening 3, which opening is pressure sealed by means of a flange 6a. The flange 6a provides a pressure sealed conduit for a lifting bar 51 of a lifting device 50, as will be explained below.

An opening is provided at a location of the bottom plate 6 that is essentially perpendicularly below the connection opening 9, which opening is pressure sealed by means of a connecting flange 6b. The connecting flange 6b serves as a pressure sealed conduit of a lifting and rotating bar 61 of a lifting and rotating device 60.

Another opening is provided in the bottom plate 6 at a position around the passage point of the middle axis 8a, which opening is provided to hold a bearing 73 of a rotating device 70 by means of a flange 6c. The rotating device 70 is implemented as a motor 71 with a switching gear 72 in the shown embodiment. The corresponding opening in the cover plate is pressure sealed by means of a flange 8b for holding a bearing 74 of the rotating device 70. The bearings 73 and 74 support an output shaft 75 that can be driven by means of a motor 71 via a gearbox 72. The output shaft 75 is arranged such that its rotational axis coincides with the middle axis 8a.

A rotating holder 21 of the moving device 20 is attached to the output shaft 75 such that it is rotatable around the middle axis 8a within a plane that is perpendicular to the middle axis 8a. The rotating holder 21 can be implemented as a circular plate that provides a relatively high moment of inertia or can also be implemented with linearly extending arms. In the embodiment shown in FIG. 1, the rotating holder 21 comprises two round apertures 22 that are formed such that their center points are a distance A from the middle axis 8a. The apertures 22 are surrounded by two circular recesses 23 on the upper side of the rotating holder 21 facing the cover plate 8, which recesses 23 are chamfered and have a predetermined diameter. The predetermined diameter of the recess 23 corresponds to the necessary tolerance of the outer diameter of the bottom plates 12 of the workpiece holding devices 10, 11, which will be described later.

The rotating holder 21 is firmly connected to a step of the output shaft 75 by screw-fitting. The bearing 73 is formed as an axial bearing and is supported in flange 6c. The output shaft 75 comprises another step on which the bearing 74 is seated, which bearing 74 is formed as a cone bearing. By this implementation, the stiffness of the bottom plate 6 and the cover plate 8 for preventing bending caused by forces acting as a result of pressure differences is significantly increased. Possible deviations of the position of the electron beam on the workpiece, which may be caused by such bending, can be avoided.

The middle axis of the lifting bar 51 and the middle axis of the lifting and rotating bar 61 are each arranged with the distance A on opposite sides of the middle axis 8a.

As a result of this arrangement, the center points of the apertures 22 of the rotating holder 21, which are arranged in the same relation to the middle axis 8a, can be arranged such that the middle axis of the lifting bar 51 and of the lifting and rotating bar 61, respectively, extend through these center points, as shown in cross-section in FIG. 1.

The lifting bar 51 of the lifting device 50 can be raised and lowered by means of the lifting cylinder 52 by the stroke H1, as shown in FIG. 1.

The lifting and turning bar 61 of the lifting and rotating device 60 can be raised and lowered by means of the lifting cylinder 62 by a stroke that corresponds to the stroke H1, and can be rotated around the middle axis of the bar 61 by means of a rotating drive 63.

The workpiece holding devices 10, 11 are shown as being identical, such that only the workpiece holding device 10 is described in the following. The workpiece holding device 10 consists in a preferred embodiment, as shown in FIG. 1, of a base plate 12, a seal 13 attached to the base plate 12, a workpiece holder 14 and a mandrel 15. In the preferred embodiment, the base plate 12 has a bowl shape, i.e., a bottom and a sidewall define an inner space. The seal 13 is arranged at the upper side of the sidewall. The mandrel 15 is formed at the side of the base plate 12 that is opposite to the seal. The base plate 12 is circular and has an outer diameter which, as was already described, corresponds to the inner diameter of the recess 23. Therefore, the workpiece holding device 10 can be accommodated within the recess 23 of the rotating holder 21 and can be supported for a rotational movement, in which the mandrel 15 projects downwards through the aperture 22. The mandrel 15, which is formed centrally at the bottom side of the base plate 12, comprises in a cross-sectional view a cone shape that tapers downwards. The center of the mandrel 15 comprises a through-hole.

The workpiece holder 14, which is formed in dependence upon the workpiece W to be held, is arranged centrally at the topside of the base plate 12.

In the embodiment shown in FIG. 1, the workpiece W is a transmission gear to be welded. Such a transmission gear comprises a through-hole. In order to hold workpieces having such through-holes, the workpiece holder 14 is formed as a collet chuck as follows. A cone piece 14a is arranged at the upper side of a bar 14d, which bar is supported so as to be slidably displaceable in the through-hole of the mandrel 15. The conical form tapers towards the bottom side of the workpiece holding device 10. The combination of cone piece 14a and bar 14d is biased by a spring 14c towards the bottom side of the workpiece holding device 10. An elastically deformable ring 14b, e.g., a metal ring having a plurality of slots axially extending from one side of the ring to a predetermined depth and allowing a radial displacement of the ring segments between the slots, is placed around the cone piece 14a; the outer diameter of the ring is slightly smaller than the inner diameter of the through-hole of the workpiece W when the ring is released. The passage of the bar 14d through the mandrel 15 is implemented so as to be essentially pressure sealed.

Due to this arrangement, while the base plate 12 is held in position, the combination of bar 14d and cone 14a can be upwardly displaced in the longitudinal direction by a force exerted from below on the bar 14d and in the longitudinal direction of the bar 14d.

In the embodiment shown in FIG. 1, the cylindrical inner space of the workpiece locking device 30 is formed with a circular cross-section having the diameter d1. The sidewall of the base plate 12 is formed with a corresponding diameter such that the seal 13 arranged at the upper side of the sidewall has an outer diameter larger than d1.

The upper side of each of the lifting bar 51 and the lifting and rotating bar 61 comprises a projection having a cone-shaped inner recess 51a, 61a. The cone shape of the inner recess is adapted to the cone shape of the mandrel 15. The control bar 53 is arranged within the lifting bar 51 so as to be shiftably displaceable along its middle axis by means of a driving device 54.

The operation of the embodiment shown in FIG. 1 will now be described, which operation is controlled by a control device, which is not shown.

The inner space 2 of the vacuum chamber 1 is evacuated via the opening 4. In this respect, the charging/discharging opening 3 is sealed by the workpiece holding device 10, as shown in the cross-sectional representation of the workpiece holding device 10 on the right side of the divided cross-section that is on the left side of FIG. 1. At that time, the lifting bar 51 of the lifting device 50 is raised by the stroke H1. Thus, the mandrel 15 engages with the inner recess 51A. The workpiece holding device 10 is raised upwards by the stroke h (refer to the comparison of the left and right sides of the cross-section of the workpiece holding device 10 on the left side of FIG. 1) and the charging/discharging opening 3 is sealed by means of the seal 13 and the sealed passage of the bar 14d in mandrel 15. Thus, the workpiece holding device 10 is raised and lifted out of the recess 23 of the rotating holder 21.

The control bar 53 is moved upwards by the driving device 54 and pushes the bar 14d upwards against the spring force of the spring 14c. Thus, no significant force is exerted on the elastic ring 14b such that its outer diameter is smaller than the inner diameter of the through-hole of the workpiece W. The inner space of the workpiece locking device 30 is then brought to normal pressure. In this state, the cover 33 is lifted and a workpiece W, such as for example a transmission gear, is placed over the elastic ring 14b.

Then, the cover 33 is closed and the inner space is evacuated via the opening 35 and the pipe 36 to the pressure level of the inner space 2 of the vacuum chamber 1. After evacuation, the lifting bar 51 is lowered by the stroke H1 and the control bar 53 is withdrawn.

By withdrawing the control bar 53, the cone piece 14a is moved due to the force of the spring 14c towards the bottom side of the workpiece holding device 10 such that the elastic ring 14b is deformed and pushed against the inner side of the through-hole of the workpiece W. In this way, the workpiece W is held. Furthermore, the workpiece holding device 10 is set down into the recess 23 of the rotating holder 21 by lowering the lifting bar 51. This state can be seen in the two-part divided cross-section of the workpiece holding device 10 on the left side of FIG. 1.

Because the inner space of the workpiece locking device 30 was evacuated to the same pressure level as the inner space 2, no change of the vacuum state of the inner space 2 is caused by lowering the workpiece holding device 10.

After the first workpiece W is introduced into the vacuum chamber by means of the above-described operation, the first workpiece W is then moved from the charging/discharging position (left side in FIG. 1) to the processing position (right side in FIG. 1) by rotating the rotating holder 21 by 180° using the rotating device 70.

At the processing position, the lifting and rotating bar 61 is raised. Because the workpiece holding device 11 is shown on the right side in FIG. 1, the operation will now be described referring to the workpiece holding device 11.

Because the bar 14d is not pushed upwards, the workpiece W remains held by the force of the spring 14c.

Because the conical shapes of the mandrel 15 and the inner recess of the lifting and turning bar 61 are adapted to match each other, a frictional force is achieved between the same, which force is sufficient for rotationally driving the workpiece holding device 11 together with the workpiece W.

The welding of workpiece W is then performed by rotating the workpiece holding device 11 and/or displacing the beam axis 44 sideward in correspondence with the prescribed conditions for processing the workpiece.

At the same time, the workpiece holding device 10 is raised again in the charging/discharging position by the lifting bar 51 such that the before-described operation can be performed again by first discharging a processed workpiece W and then by replacing it with a new workpiece W to be processed. Because the vacuum chamber 2 is sealed by the workpiece holding device 10 being upwardly pushed, the processing operations performed in the processing position can be simultaneously performed under vacuum.

It is obvious that the drastic reduction of the volume that is required to be brought to normal pressure and then evacuated will result in a significant reduction of the necessary pumping times due to the use of the workpiece locking device 30. Additionally, a workpiece change (replacement) can be carried out simultaneously with the processing, thereby also resulting in a drastic reduction of the cycle times.

This reduction is achieved, in particular, due to the multi-functionality of the workpiece holding devices 10, 11, which simultaneously seal the vacuum chamber 2 and the workpiece locking device 30 and hold and release the workpiece W. Additionally, the construction also makes possible movement of the workpiece W in the processing position.

The bowl shape of the preferred embodiment of the workpiece holding device 10 has a significant advantage in that the stroke movement necessary for sealing is significantly reduced. As is obvious in FIG. 1, only the stroke length h is necessary, even though the height of the workpiece W to be introduced into the chamber is significantly longer.

Nevertheless, if the processing time for processing the workpiece with the electron beam is shorter than the time necessary for changing the workpieces, the cycle time for charging and discharging can be further reduced by introducing a second charging/discharging opening.

An advantageous embodiment with two charging/discharging openings is shown schematically in a top view in FIG. 2.

In the embodiment of FIG. 1, the connection and the charging/discharging opening were arranged with partition of 180° around the middle axis 8a (rotational axis of the workpiece movement). In the embodiment in FIG. 2, two charging/discharging openings 3a, 3b and one connection 9 are arranged with a partition of 120° therebetween (i.e., the openings 3a, 3b and the connection 9 are uniformly allocated around the middle axis 8a).

The cycle time necessary for changing the workpiece obviously can be further reduced with this implementation, as there is no charging and discharging at each position; instead, only a charging or discharging at each position is necessary.

Consequently, by merely providing a further workpiece changing lock, the efficient use of the electron beam generator and the vacuum chamber can be improved, which are significantly more expensive devices than the workpiece changing lock.

In the alternative, the workpiece moving device can, of course, be formed in another manner. For that purpose, a linear movement instead of a rotational movement is conceivable. In that case, the connector for the electron beam generator can be positioned between a discharging opening and a charging opening.

It is also possible, as was already mentioned above, to use other arrangements with two or more electron beam generators and one or two charging/discharging openings per electron beam generator.

In FIG. 1, only a vertical arrangement of the electron beam generator is shown. Of course, it is possible to arrange an electron beam generator at the side.

The embodiment of FIG. 1 is directed to minimizing the stroke h.

In a more preferred embodiment, the seal 13 is not provided on the multi-functional workpiece holding device 10, 11, but at the vacuum chamber 1 or at the lower boundary of the workpiece lock 30 surrounding the charging/discharging opening. This arrangement has, in addition to the reduction of the number of seals, the significant advantage that the seal does not come close to the electron beam. In particular, if the seal is made of an insulating material, a danger of arcing would result due to electrostatic charging.

If a stroke h as short as possible is not so important and if more emphasis is placed on further reducing the contamination of the inner space 2 of the vacuum chamber, the base plate is not formed as a bowl shape, but rather as a flat shape. Thus, the surface area is significantly reduced, which surface area can be contaminated from the outside at the time of changing the workpiece.

According to a preferred modification of the above described embodiments, the lifting device 50 and the lifting and rotating device 60, which may be implemented there, for example, as hydraulic devices, can be replaced by corresponding electronic devices. This electronic lifting device and this electronic lifting and rotating device are arranged in the vacuum chamber and not, as in the described first embodiment, partially outside. According to a further preferred modification, these electronic devices each represent one electrical axis of a CNC machine, in which the rotating device 70 is then also preferably implemented as an electronic servo representing a further electrical axis of the CNC machine.

According to a further preferred modification of the above embodiments, the processing chamber (or process chamber) for the processing of the workpiece is formed so that a workpiece holding device 11, while in the processing position (right side in FIG. 1), is lifted such that a space is defined by a part of the electron beam generator 40 positioned above the opening 9 and the workpiece holding device 11, which space is sealed with respect to the remaining vacuum chamber 1. This sealing is possible with a bowl-shaped workpiece holding device, as well as a flat workpiece holding device, without further effort. The formation of such a processing chamber, which is sealed with respect to the remaining vacuum chamber during the processing of the workpiece, has the advantage that the X-rays generated during the electron beam processing are prevented from escaping from the processing chamber, and that contaminants, such as welding particles, metal vapour, etc., which are unavoidably generated during the welding operation, cannot enter into the remaining vacuum chamber 1, but can be suctioned out of the vacuum chamber.

According to a further preferred modification of the above-described embodiments and modifications, the connection between the workpiece holding devices 10, 11 and the lifting bar 51 and the lifting and rotating bar 61, respectively, is implemented by toothed systems, for example, a so-called Hirt tooth system, instead of the cone-shaped projection 15 and the corresponding cone-shaped inner recesses 51A, 61A. Such toothed systems (e.g., gear toothed systems) makes possible a transfer and positioning of workpieces, respectively, with the correct relative positioning, in case the orientation is important for the processing performed by the electron beam.

In the above-described first embodiment, the inner space of the workpiece locking device 30 is evacuated to the same pressure level as the inner space 2. According to a further modification, if the volume of the inner space 2 is significantly larger than the volume of the workpiece locking device 30, for example by a factor of 5, 10, 20, 30 or larger, it is preferred that the inner space of the workpiece locking device 30 is only evacuated to approximately the same pressure level as the inner space 2. In this regard, approximately the same pressure level means that the factor, by which the pressure level in the inner space of the workpiece locking device 30 may be higher than the pressure level in the inner space 2, can be a factor that is smaller than the corresponding factor of the volumes, for example ½ or ¼ or ⅛ or less of this factor (i.e., ¼×5=1.25).

The above-described workpiece holding devices hold one workpiece. According to a further modification, more than one workpiece, for example three workpieces, can be held by a single workpiece holding device. This is then formed preferably such that the single workpieces can be brought individually, i.e., independent of the other workpieces held by the same workpiece holding device.

What is claimed is:

1. An apparatus for processing a workpiece by an electron beam, comprising:

at least one electron beam gun, and a workpiece supply device comprising:

a vacuum chamber having at least one connector per electron beam gun and at least one charging/discharging opening, at least two workpiece holding devices disposed in the vacuum chamber, wherein the workpiece holding devices are arranged and constructed to close the at least one charging/discharging opening in an air-tight manner, each workpiece holding device comprising a base plate and a workpiece holder, wherein the workpiece holding devices are also arranged and constructed to seal a processing chamber defined in the vacuum chamber when one workpiece holding device is disposed in the processing position, which processing chamber is at least partially defined by the connector, the electron beam gun and the workpiece holding device, and a seal disposed on at least one of each workpiece holding device and each charging/discharging opening, a moving device arranged and constructed to move the workpiece holding devices to a corresponding charging/discharging position at the at least one charging/discharging opening and to a processing position at the at least one connector for the electron beam gun, the moving device being disposed in the vacuum chamber and arranged and constructed to move the workpiece holding devices to a closing position of the at least one charging/discharging opening, wherein the moving device comprises:

a holder and a lifting device arranged and constructed to raise and lower the workpiece holding devices when disposed in the charging/discharging position(s) and in the processing position such that the workpiece holding devices, when being raised, are lifted out of the holder and, when being lowered, are set down onto the holder, and at least one workpiece locking device per charging/discharging opening, the at least one workpiece locking device being selectively evacuatable or can brought to normal pressure, and wherein the at least one workpiece locking device comprises a closable lock opening.

2. An apparatus according to claim 1, wherein the seal is disposed on the charging/discharging opening so as to cooperate with an edge of the base plate to form an airtight seal.

3. An apparatus according to claim 2, wherein the workpiece holding device comprises a projection on a side facing the lifting device, which projection can be brought into engagement with the lifting device.

4. An apparatus as in claim 3, wherein the projection is a mandrel.

5. An apparatus according to claim 3, wherein the base plate has a bowl-shaped form, and the at least two workpiece holders are each arranged and constructed to support a workpiece W within the bowl-shaped form.

6. An apparatus according to claim 5, wherein the moving device is arranged and constructed to move the workpiece holding devices within a plane between the charging/discharging positions and the processing positions.

7. An apparatus according to claim 6, wherein the moving device further comprises a rotating holder having at least one holding device per workpiece holding device.

8. An apparatus according to claim 1, wherein the seal is disposed at an edge of the base plate so as to cooperate with an edge of the charging/discharging opening to form an air-tight seal.

9. An apparatus according to claim 1, wherein the moving device is arranged and constructed to move the workpiece holding devices within a plane between the charging/discharging positions and the processing positions.

* * * * *

UNITED STATES PATENT AND TRADEMARK OFFICE
CERTIFICATE OF CORRECTION

PATENT NO. : 7,019,252 B2 Page 1 of 1
APPLICATION NO. : 10/490518
DATED : March 28, 2006
INVENTOR(S) : Ingo Kloss It is certified that error appears in the above-identified patent and that said Letters Patent is hereby corrected as shown below:

On the Title Page
Item 54 and Col. 1, Line 1
In the title of the invention please change from
"Workpiece Feeder Device For An Electron Beam Processing Device" to
--Workpiece Supplying Device For An Electron Beam Processing Device--

Signed and Sealed this

Twenty-eighth Day of November, 2006

JON W. DUDAS
*Director of the United States Patent and Trademark Office*